United States Patent
Zhou et al.

(10) Patent No.: US 12,298,187 B2
(45) Date of Patent: May 13, 2025

(54) FLAT PANEL DETECTOR AND DISPLAY DEVICE

(71) Applicants: Beijing BOE Sensor Technology Co., Ltd., Beijing (CN); BOE Technology Group Co., Ltd., Beijing (CN)

(72) Inventors: Lin Zhou, Beijing (CN); Cheng Li, Beijing (CN); Tiansheng Li, Beijing (CN); Shoujin Cai, Beijing (CN); Chuncheng Che, Beijing (CN); Feng Liu, Beijing (CN); Yingzi Wang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/639,257

(22) PCT Filed: Apr. 28, 2021

(86) PCT No.: PCT/CN2021/090478
§ 371 (c)(1),
(2) Date: Nov. 3, 2022

(87) PCT Pub. No.: WO2022/226826
PCT Pub. Date: Nov. 3, 2022

(65) Prior Publication Data
US 2024/0044714 A1    Feb. 8, 2024

(51) Int. Cl.
*G01J 5/10* (2006.01)
*G06F 18/20* (2023.01)

(52) U.S. Cl.
CPC ............. *G01J 5/10* (2013.01); *G06F 18/20* (2023.01); *G01J 2005/106* (2013.01)

(58) Field of Classification Search
CPC ........ G01J 5/10; G01J 2005/106; G06F 18/20
See application file for complete search history.

(56) References Cited

U.S. PATENT DOCUMENTS

2006/0146415 A1* 7/2006 Kim ................. H01L 27/14687
                                                            359/642
2017/0300736 A1* 10/2017 Song ................. G06V 40/1312
(Continued)

FOREIGN PATENT DOCUMENTS

CN          1819243 A     8/2006
CN          1917222 A     2/2007
(Continued)

*Primary Examiner* — Stephen G Sherman
(74) *Attorney, Agent, or Firm* — IPro, PLLC

(57) ABSTRACT

A flat panel detector is provided, which includes a base substrate and a plurality of detection regions arranged in an array on the base substrate, where each detection region is successively provided with a photosensitive sensor and an optical structure along a direction away from the base substrate; the optical structure includes a condensing unit and a light filtering unit, where the condensing unit is used for receiving the near-infrared light and ambient light emitted by the laser light source and performing condensing, and the light filtering unit is configured to shield the ambient light and transmitting the near-infrared light; a photosensitive sensor which includes an amorphous silicon photodiode and a thin film transistor, where the amorphous silicon photodiode is configured to convert the near-infrared light transmitted by the light filtering unit into an electrical signal.

15 Claims, 5 Drawing Sheets

(56) References Cited

U.S. PATENT DOCUMENTS

| | | | |
|---|---|---|---|
| 2017/0357843 A1* | 12/2017 | Chen | G06V 40/1365 |
| 2021/0234059 A1* | 7/2021 | Bu | H01L 31/02161 |
| 2022/0163812 A1 | 5/2022 | Li et al. | |

FOREIGN PATENT DOCUMENTS

| | | | | |
|---|---|---|---|---|
| CN | 105444880 A | | 3/2016 | |
| CN | 107910340 A | | 4/2018 | |
| CN | 208126643 U | | 11/2018 | |
| CN | 109558866 A | | 4/2019 | |
| CN | 109801935 A | * | 5/2019 | ........... G01T 1/2018 |
| CN | 110308587 A | * | 10/2019 | ........... G02B 6/0051 |
| CN | 211877235 U | | 11/2020 | |
| CN | 112086526 A | | 12/2020 | |
| CN | 112086530 A | | 12/2020 | |
| CN | 112446318 A | | 3/2021 | |
| JP | 2008071959 A | | 3/2008 | |
| JP | 2010147110 A | | 7/2010 | |

\* cited by examiner

FLAT PANEL DETECTOR AND DISPLAY DEVICE

CROSS-REFERENCE TO RELATED APPLICATION

The present application is the U.S. national phase of PCT Application No. PCT/CN2021/090478 filed on Apr. 28, 2021, which is incorporated herein by reference in its entirety.

TECHNICAL FIELD

The present disclosure relates to the technical field of near-infrared laser detection, and more particularly to a flat panel detector and a display device.

BACKGROUND

With the continuous development of a communication technology, an electronic technology, and a display technology, the display device with a human-computer interaction function has been paid more and more attention. In order to realize the interactive application of a display panel in aspects of visible light and near-infrared light, in the related art, an up-conversion material is used to convert the visible or near-infrared light into ultraviolet light, and a metal oxide transistor is used to realize the positioning interaction of interactive light in response to ultraviolet light. However, in order to improve the detection sensitivity of the near-infrared light and reduce the impact on display efficiency, an existing display panel process needs to be adjusted and changed, and an additional process development and adjustment is required, which greatly affects the yield of the display panel and is difficult to be widely promoted. And a strong near-infrared laser light source signal has a certain degree of security risks.

SUMMARY

In order to achieve the above-mentioned object, the embodiments of the present disclosure adopt the following technical solutions: the flat panel detector, which includes a base substrate and a plurality of detection regions arranged in an array on the base substrate, wherein each of the detection regions is successively provided with a photosensitive sensor and an optical structure along a direction away from the base substrate;
  the optical structure includes a condensing unit and a light filtering unit, wherein the condensing unit is used for receiving near-infrared light emitted by a laser light source and ambient light and performing light condensing and the light filtering unit is configured to shield the ambient light and transmitting the near-infrared light;
  the photosensitive sensor includes an amorphous silicon photodiode and a thin film transistor, wherein the amorphous silicon photodiode is configured to convert the near-infrared light transmitted by the light filtering unit into an electrical signal, and the thin film transistor is configured to output the electrical signal to a reading signal line;
The orthographic projection of the optical structure on the base substrate completely covers the orthographic projection of the photosensitive sensor on the base substrate.

Optionally, the light condensing unit and the light filtering unit are provided independently, wherein the light condensing unit is located on a side of the light filtering unit away from the base substrate and the orthographic projection of the light condensing unit on the base substrate completely covers the orthographic projection of the light filtering unit on the base substrate.

Optionally, the condensing unit is a transparent lens and the light filtering unit includes a black light shielding film layer.

Optionally, the condensing unit is the transparent lens, and the light filtering unit includes the black light shielding lens.

Optionally, the condensing unit and the light filtering unit are integrally provided as an integral structure.

Optionally, the optical structure is the black light shielding lens.

Optionally, the amorphous silicon photodiode includes a first electrode, a second electrode, and a photosensitive layer located between the first electrode and the second electrode arranged in sequence along a direction away from the base substrate, and the first electrode is connected to a drain electrode or a source electrode of the thin film transistor.

Optionally, the orthographic projection of the center of the amorphous silicon photodiode on the base substrate coincides with the orthographic projection of the center of the optical structure on the base substrate.

Optionally, a quantum dot thin film located between the optical structure and the photosensitive sensor is included, which is configured to convert the near-infrared light emitted from the optical structure into the visible light, and the photosensitive sensor is configured to convert the visible light into the electrical signal and outputting the electrical signal.

The embodiments of the present disclosure also provide the display device, which includes a display panel, a backlight module, and the above-mentioned flat panel detector, wherein the flat panel detector is located between the display panel and the backlight module;
  the display device further includes a signal processing structure which is configured to connect to the photosensitive sensor through a read signal line to obtain a laser spot grayscale image.

Optionally, the display panel includes a plurality of pixels, the orthographic projection of the detection region on the display panel covers the plurality of pixels, and the size of the detection region is 5-20 times the size of one pixel of the plurality of pixels.

Optionally, the black light shielding film layer has a thickness of 2-8 μm in a direction perpendicular to the base substrate and the size of the black light shielding film layer in a direction parallel to the base substrate is 3-50 μm larger than that of the amorphous silicon photodiode.

Optionally, the photosensitive sensor includes the amorphous silicon photodiode and the thin film transistor, wherein the amorphous silicon photodiode has a size smaller than or equal to that of a pixel of the display panel.

Optionally, the size of the pixel of the display panel is 1-10 times the size of the amorphous silicon photodiode, and the pitch between two adjacent amorphous silicon photodiodes is 5-20 times the pitch between two adjacent pixels on the display panel.

Optionally, the optical structure is the black light shielding lens, or the condensing unit is the transparent lens, the light filtering unit includes a black light shielding lens, and the photosensitive sensor includes the amorphous silicon photodiode and the thin film transistor;

The cross-sectional area of the black light shielding lens in the direction parallel to the base substrate is 4-10 times the area of the amorphous silicon photodiode in the direction parallel to the base substrate.

Advantageous effects of the present disclosure are: the detection sensitivity of the near-infrared light can be improved by the arrangement of the optical structure to perform the functions of light concentration and light filtering, and the intensity of the near-infrared light can be reduced under the light concentration function of the optical structure, thereby improving the safety; at the same time, the photosensitive sensor with a relatively small area and the optical structure with a relatively large area cooperate to enable the flat panel detector to have a relatively high transmittance, and when integrated with the display module, the influence on the display effect can be reduced, thus reducing the difficulty of the integration process of the flat panel detector and the display module.

DETAILED DESCRIPTION

Figure 1:
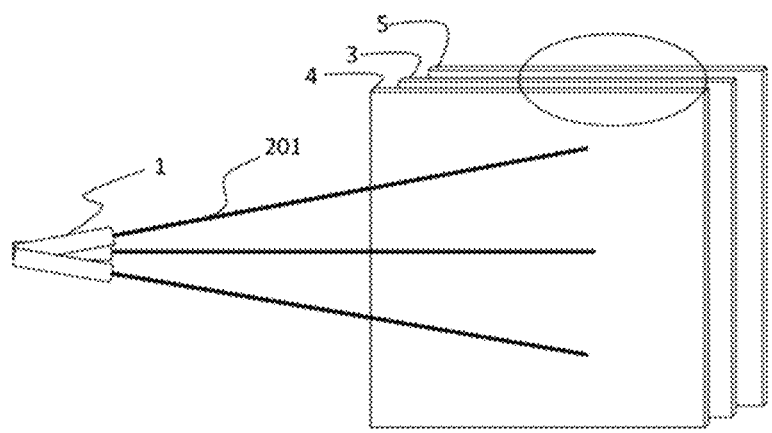
FIG. 1 is a schematic structural diagram of a display device according to an embodiment of the present disclosure.
Figure 2:
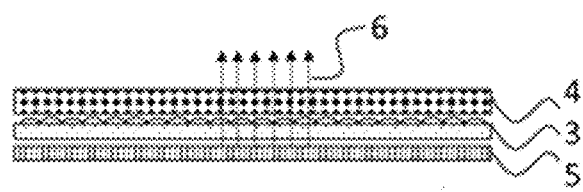
FIG. 2 is an enlarged diagram of a partial structure of FIG. 1.

To further clarify the objectives, features and advantages of the embodiments of the present disclosure, the technical solutions in the embodiments of the present disclosure will be clearly and completely described below in combination with the drawings in the present disclosure. It is apparent that the described embodiments are not all embodiments but part of embodiments of the present disclosure. Based on the embodiments in the present disclosure, all other embodiments obtained by a person of ordinary skill in the art without inventive effort are within the scope of protection of this disclosure.

In the description of the present disclosure, it should be understood that the orientation or positional relationship indicated by the terms "center", "upper", "lower", "front", "rear", "left", "right", "vertical", "horizontal", "top", "bottom", "inner", "outer", and the like is based on the orientation or positional relationship shown in the drawings, and is merely for convenience of describing the disclosure and simplifying the description, but not intended or implied that the referenced device or element must have a particular orientation, be constructed and operated in a particular orientation, and thus should not be construed as limiting the present disclosure. The terms "first", "second", and "third" are used for descriptive purposes only and are not to be construed as indicating or implying relative importance.

Figure 3:
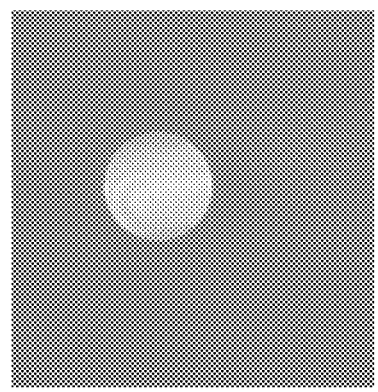
FIG. 3 is a light spot grayscale image obtained by a flat panel detector according to an embodiment of the present disclosure.

In a liquid crystal display industry, an amorphous silicon is widely used as an active layer material of a transistor in liquid crystal display. At the same time, the amorphous silicon is easy to prepare in a large area and has good compatibility with a display industry. However, the application of the amorphous silicon in the field of near-infrared detection is rarely known. This is mainly because a band gap of the amorphous silicon is in a range of 1.6-1.8 eV, and the amorphous silicon is generally considered to have no response to light in the near-infrared band. However, we found that the amorphous silicon has a near-infrared response, and the external quantum efficiency (EQE) of the prepared amorphous silicon photodiode (thickness 1 μm) is about 0.03% in the test of light in the 850 nm wavelength band. The actually prepared amorphous silicon flat panel detector shows effective detection of a near-infrared laser light source (850 nm, 1 mW), which meets the requirements of near-infrared interaction. The light spot grayscale image obtained by the amorphous silicon detector in FIG. 3 is referenced.

Referring to FIGS. 1-10, aiming at the above-mentioned problems, the present embodiment provides a flat panel detector 3 which includes a base substrate and a plurality of detection regions 300 arranged in an array on the base substrate, wherein each of the detection regions 300 is successively provided with the photosensitive sensor and the optical structure along a direction away from the base substrate;

the optical structure includes a light condensing unit 304 and a light filtering unit 303, wherein the light condensing unit 304 is used for receiving the near-infrared light 201 emitted by the laser light source 1 and the ambient light 202 and performing light condensing, and the light filtering unit 303 is configured to shield the ambient light 202 and transmitting the near-infrared light 201;

the photosensitive sensor includes an amorphous silicon photodiode 302 and a thin film transistor 301, wherein the amorphous silicon photodiode 302 is configured to convert the near-infrared light 201 transmitted by the light filtering unit 303 into the electrical signal and the thin film transistor 301 is configured to output the electrical signal via a reading signal line;

The orthographic projection of the optical structure on the base substrate completely covers the orthographic projection of the photosensitive sensor on the base substrate, and the cross-sectional area of the optical structure in the direction parallel to the base substrate is larger than the cross-sectional area of the corresponding photosensitive sensor in the direction parallel to the base substrate.

In the embodiment of the present disclosure, the amorphous silicon photodiode 302 is used to realize that the crystalline silicon flat panel detector can be prepared in a large area; when the flat panel detector 3 is integrated with the display module, there is no need to make any adjustment to the process of an existing display panel 4; the advantage that the flat panel detector 3 can be prepared in the large area is used, a flat panel detector with a size of 1:1 can be made for any display product, and the flat panel detector 3 is hung outside the display module of the existing product, so that a near-infrared human-computer interaction function can be realized and can be simply integrated into the display module.

When the flat panel detector 3 is integrated with the display module, the laser signal must have larger loss because of the barrier of the display module before reaching a detector panel, and at the same time, the near-infrared light has a safety threshold for human eyes and a laser exceeding a certain power density is not suitable for a consumer-grade product.

At the same time, if the flat panel detector 3 is used to detect the near-infrared laser light, the ultra-low absorption coefficient of the amorphous silicon itself to the near-infrared light means that a strong near-infrared laser light source signal is required and there is a certain degree of risks.

In the embodiment of the present disclosure, the arrangement of the optical structure serves the functions of light concentration and light filtering; the near-infrared light 201 emitted by the laser light source 1 can enter from the optical structure with a larger area; after the light concentration and light filtering of the optical structure, the near-infrared light 201 is concentrated onto the photosensitive sensor with a smaller area; with respect to the technical solution of the near-infrared light 201 being directly transmitted to the photosensitive sensor, the power of the laser light source is reduced, without reducing the detection effect, and the concerns of safety when detecting the near-infrared light 201 can be reduced.

In the embodiment of the present disclosure, the optical structure is located directly above the photosensitive sensor, the cross-sectional area of the optical structure in the direction parallel to the base substrate is greater than the cross-sectional area of the corresponding photosensitive sensor in the direction parallel to the base substrate, which increases an effective photosensitive area of the amorphous silicon photodiode 302 and improves the sensitivity of the flat panel detector 3 to the near-infrared light 201, and when the flat panel detector 3 is integrated with the display module, each of the optical structures corresponds to the plurality of pixels on the display module, by increasing the difference between the area of the optical structure and the area of the photosensitive sensor, a higher transmittance can be achieved, and the influence of the flat panel detector 3 on the display effect of the display module can be reduced.

It should be noted that the size of the amorphous silicon photodiode may be less than or equal to the size of the pixel in the display module to be integrated, for example, the size of the amorphous silicon photodiode may be 400 μm^2-40000 μm^2 (the size of the thin film transistor 301 is generally small, for example, 7-8 μm or tens of μm, which can be ignored in calculating the size proportional relationship between the photosensitive sensor and the pixel in the display module), and due to the arrangement of the optical structure, the size of the amorphous silicon photodiode 302 may be reduced in the present embodiment. That is to say, the size of the photosensitive sensor is reduced, in some embodiments, the size of the pixel in the display module is 1-10 times the size of the photosensitive sensor, and the size of the optical structure is 5-20 times the size of the pixel in the display module (in some embodiments, the size of the optical structure can be 1-5 mm); and by the cooperation of the optical structure and the photosensitive sensor, on the basis of ensuring the effect of detecting the near-infrared light 201, the transmittance can be increased, and in one embodiment of the present embodiment, the transmittance of the flat panel detector 3 is greater than 99%, when integrated with the display module, the influence on the display effect is greatly reduced.

In the embodiment of the present disclosure, in order to reduce wiring, the amorphous silicon photodiode 302 is arranged close to the thin film transistor 301 in the direction parallel to the base substrate.

The light condensing unit 304 achieves a light condensing function to enhance the intensity of the near-infrared light 201 entering the photosensitive sensor; the light filtering unit 303 achieves a filtering function to filter out the ambient light 202 and transmit the near-infrared light 201 so as to avoid interference and improve detection accuracy; and the specific structural forms of the light condensing unit 304 and the light filtering unit 303 can be set according to actual needs, and can be set separately and independently, or can be set integrally.

In one embodiment of the present embodiment, the light condensing unit 304 and the light filtering unit 303 are separately set, the light condensing unit 304 is located on a side of the light filtering unit 303 away from the base substrate, and the orthographic projection of the light condensing unit 304 on the base substrate completely covers the orthographic projection of the light filtering unit 303 on the base substrate.

Figure 5:
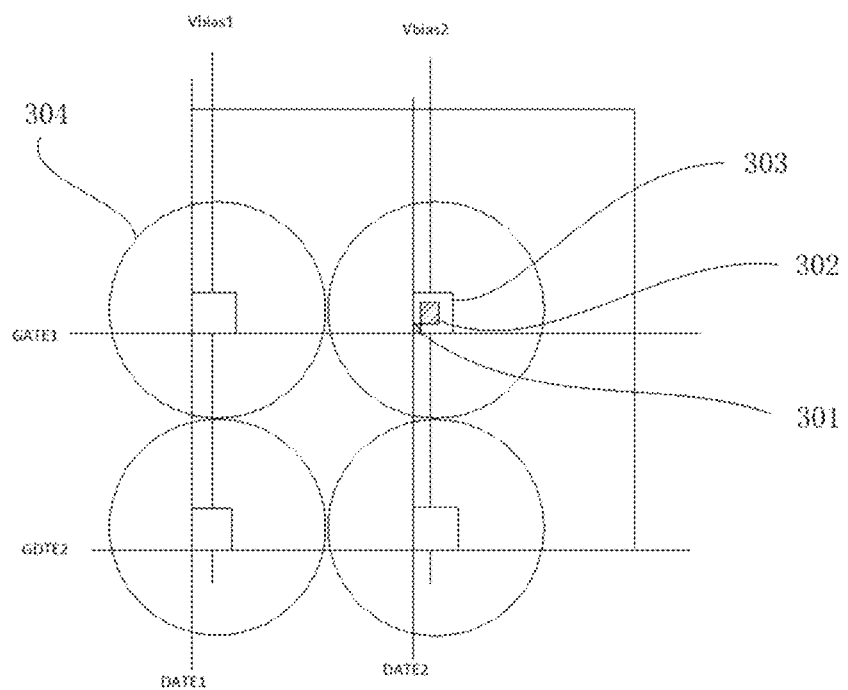
FIG. 5 is a schematic structural diagram 1 showing a flat panel detector.
Figure 6:
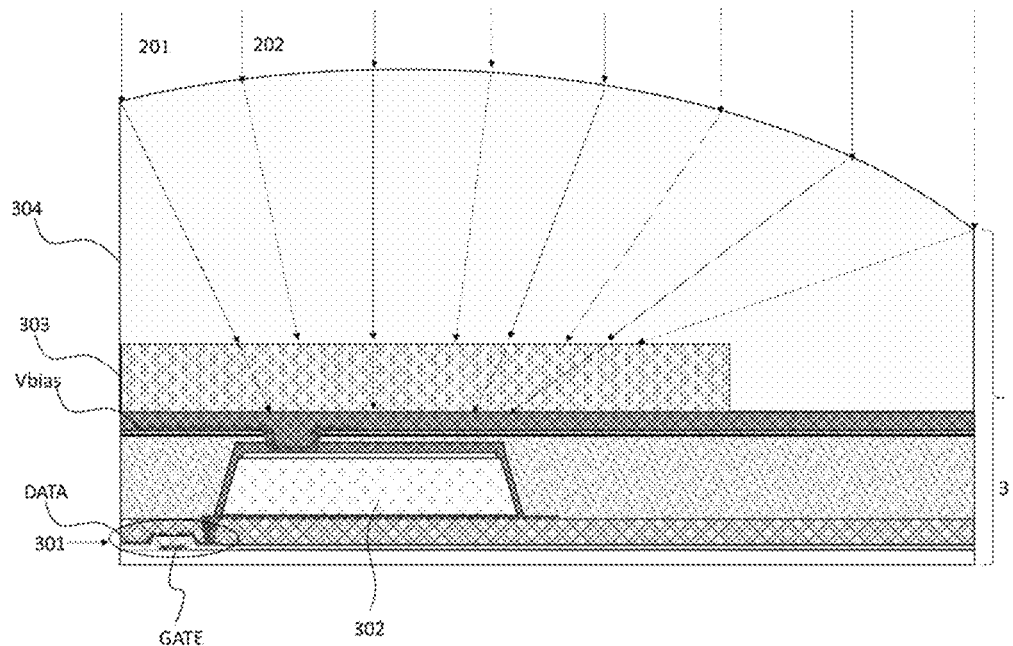
FIG. 6 is a schematic structural diagram 2 showing a flat panel detector.

Referring to FIGS. 5 and 6, illustratively in the present embodiment, the light condensing unit 304 is the transparent lens and the light filtering unit 303 includes the black light shielding film layer.

The arrangement of the transparent lens improves transparency while achieving a light concentrating effect.

The near-infrared light 201 mixed with the ambient light 202 converges through the transparent lens and passes through the black light shielding film layer, the ambient light 202 is filtered, and the transmitted near-infrared light 201 reaches the amorphous silicon photodiode 302 and is absorbed and converted into the electrical signal. The presence of the transparent lens cannot only increase an actual sensing area of the flat panel detector 3, and after being integrated with the display module, according to a principle of optical path reversibility, the backlight 6 of the display module diverges via the transparent lens, so that the influence of the flat panel detector 3 on the display effect of the display module can be greatly reduced and adverse optical effects such as moiré patterns which may be formed between the pixel array of the display panel 4 and the detection region of the flat panel detector 3 are eliminated.

In the embodiment of the present disclosure, in the direction perpendicular to the base substrate, the center of the transparent lens coincides with the center of the amorphous silicon photodiode, thereby effectively improving the light intensity of the near-infrared light 201 and improving a light utilization rate.

In one embodiment of the present embodiment, the black light shielding film layer is a black matrix, but is not limited thereto.

Illustratively in the present embodiment, the black light shielding film layer has a thickness of 2-8 μm and is expanded by 3-50 μm compared to a photosensitive area of the amorphous silicon diode to shield the influence of the ambient light 202 and the reflected light of the backlight 6, and the influence on the transparency is minimized.

Figure 9:
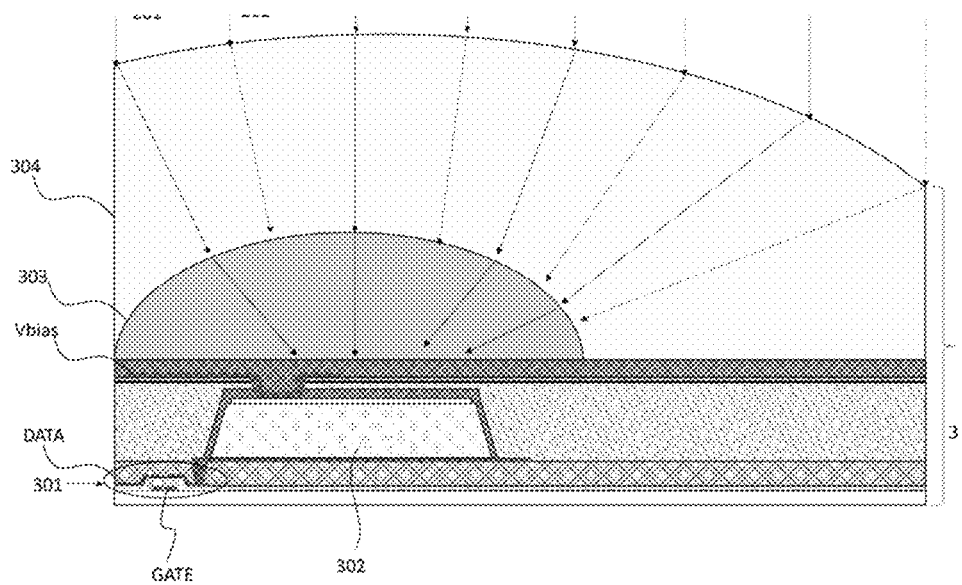
FIG. 9 is a schematic structural diagram 5 showing a flat panel detector.

Referring to FIG. 9, in one embodiment of the present embodiment, the light condensing unit 304 is the transparent lens and the light filtering unit 303 includes a black light shielding lens.

Converting light from a larger diameter region to a smaller region, for example converting the light from a 3-5 mm diameter region to the surface of the amorphous silicon photodiode 302 only with a side length of only 30-50 μm requires that the refractive index of the transparent lens itself is sufficiently large and the curvature is very large, so that an implementation process is difficult. In the embodiment of the present disclosure, the light filtering unit 303 is set as the black light shielding lens, and the transparent lens array is prepared on the basis of arraying the black light shielding lens, that is to say, under the effect of double light concentration, the light in the area with the diameter of 3-5 mm is originally required to be concentrated on the surface of the amorphous silicon photodiode 302 with the side length of only 30-50 μm, and the light in the area with the diameter of 3-5 mm is now required to be concentrated on the surface of the black light shielding lens with the side length of 60-250 μm. The requirements for a transparent lens array are reduced, the process difficulty is reduced and a material selection range is relaxed.

In one embodiment of the present embodiment, the light condensing unit 304 and the light filtering unit 303 are integrally provided as an integral structure.

The light condensing unit 304 and the light filtering unit 303 are integrally arranged as the integral structure, and compared with the light condensing unit 304 and the light filtering unit 303 which are separately arranged, the structural arrangement is simplified.

Figure 7:
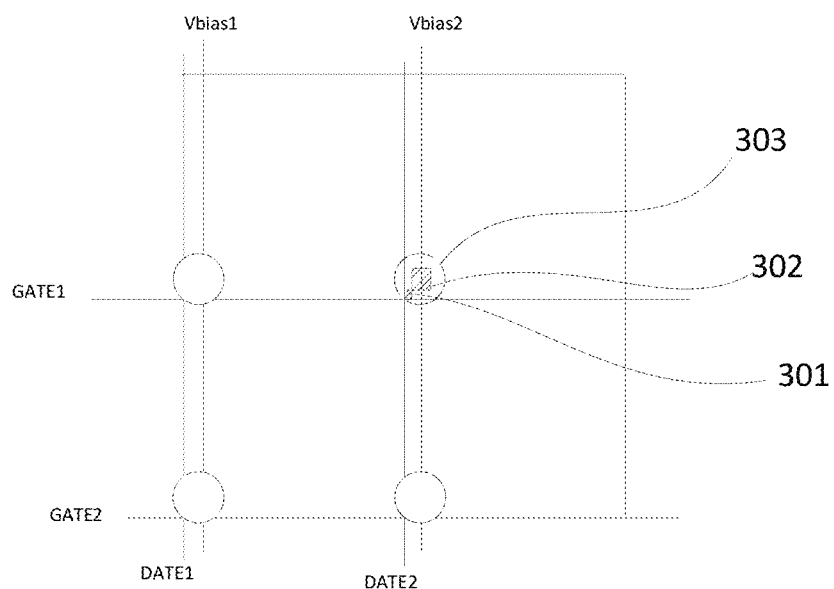
FIG. 7 is a schematic structural diagram 3 showing a flat panel detector.
Figure 8:
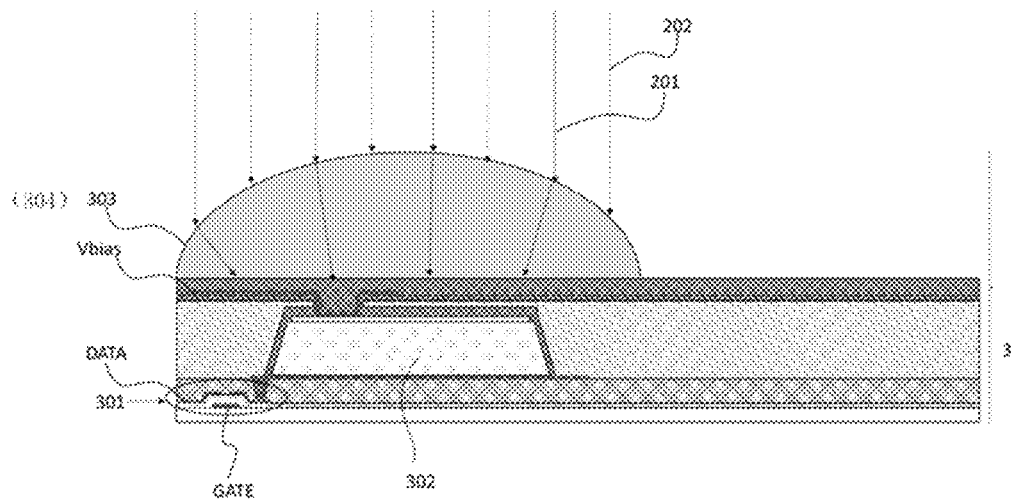
FIG. 8 is a schematic structural diagram 4 showing a flat panel detector.

Referring to FIGS. 7 and 8, illustratively in the present embodiment, the optical structure is the black light shielding lens.

In order to balance the display effect and the detection effect of the flat panel detector 3, the size of the black light shielding lens should not be too large and at the same time not too small. If the black light shielding lens is too large, when the black light shielding lens is integrated with the display module, the transmittance of the backlight 6 is affected, and the display effect is also affected; if the black light shielding lens is too small, an actual sensing area of the flat panel detector 3 cannot be effectively increased and at the same time, since the edge of the black light shielding lens is thin, the effect of the black light shielding lens itself shielding visible light may be affected. Based on the above considerations, in a specific embodiment of the present embodiment, the size of the black light shielding lens is 4-10 times the area of a photosensitive diode, and if the amorphous silicon photodiode 302 is 30*30 μm, the diameter of the black light shielding lens should be 60-100 μm. The sensitivity of the flat panel detector 3 can be improved by 4-10 times while the display effect is not significantly affected.

Illustratively in the present embodiment, the amorphous silicon photodiode 302 includes a first electrode, a second electrode, and a photosensitive layer located between the first electrode and the second electrode, which are sequentially arranged in the direction away from the base substrate, and the first electrode is connected to a drain electrode or a source electrode of the thin film transistor 301.

Figure 10:
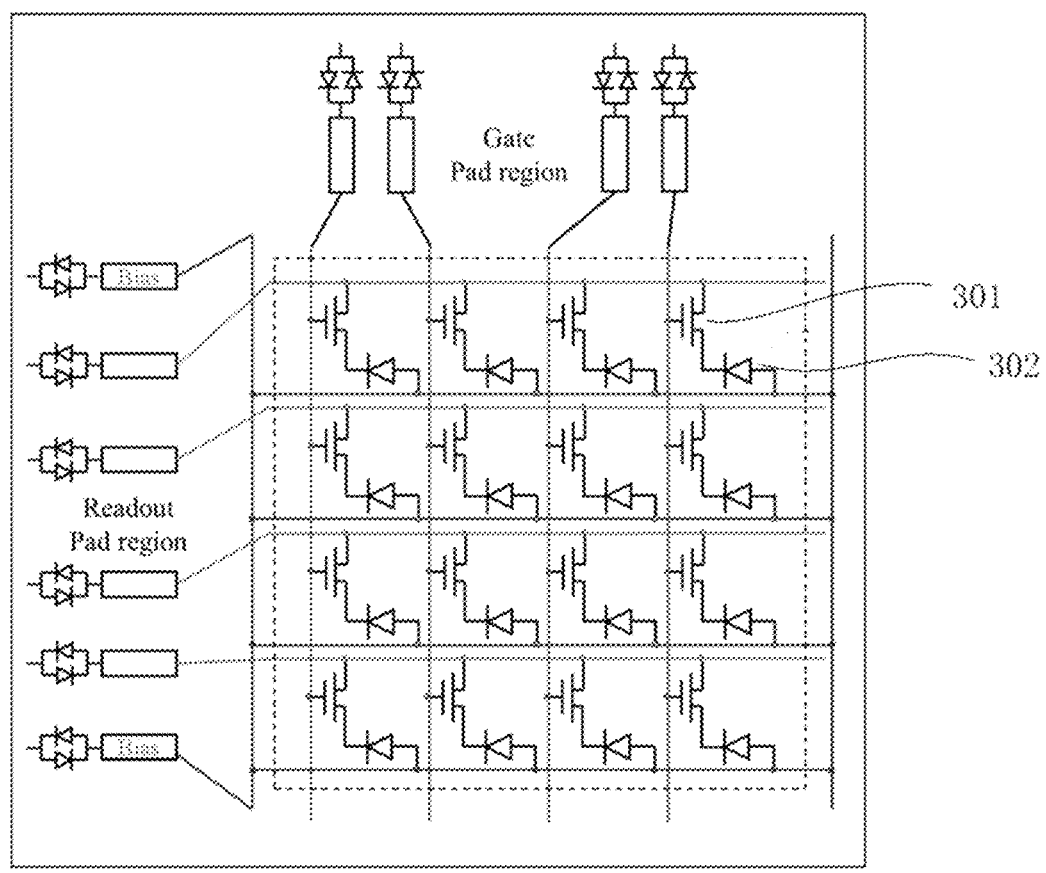
FIG. 10 is a schematic diagram of a circuit principle of a photosensitive sensor.

Referring to FIG. 10, in the present embodiment, the amorphous silicon photodiode 302 includes a P end and an N end, wherein the P end has a Bias line for applying a fixed reverse bias voltage, which is generally −7V (can be −1-10V), the N end is connected to the source electrode of the thin film transistor 301 and the N end has a potential consistent with a Reference Voltage on a read IC (ROIC) in a read circuit, which is generally +1V. The amorphous silicon photodiode irradiated by the near-infrared laser absorbs photons to generate photo-generated electron-hole pairs, and electrons accumulate at the N end, so that the potential at the N end changes from +1V to the potential at the P end. Generally, the optical signal quantity that changes the potential at the N end to the potential at the P end is called a physical full-well signal quantity, which is related to the capacitance of the amorphous silicon photodiode 302 itself, and generally, the detector operates in a linear region. When the potential of the source electrode of the thin film transistor 301 subjected to light changes, a Gate drive IC turns on the thin film transistor 301 row by row, there is a potential difference between the source electrode and the drain electrode of the thin film transistor 301 where the potential change occurs, and the optical signal is converted into an electron flow, which is read by a ROIC and converted into gray value information. Finally an IC output gray value matrix, i. e. a gray value image is read.

In the embodiment of the present disclosure, the flat panel detector 3 further includes a reading circuit for reading the electric signal output from the thin film transistor 301 and outputting the gray value information.

In addition to realizing the position interaction of the near-infrared light 201 source, the flat panel detector 3 in the present embodiment can also judge the intensity of the near-infrared light 201 of the laser light source and the size of the formed light spot, and can realize a variety of interaction functions in combination, so as to satisfy a variety of user requirements. For example, when a near-infrared laser pen is given a transmission power with a different intensity, the flat panel detector 3 can acquire a track image formed by the movement of the laser spot in real time, and laser beams with different intensities reacting to the flat panel detector 3 are spot images with different gray scales, and it can be considered that the spots with different gray scales are defined as functions such as a left key, a right key, and a double-click. At the same time, on the basis that the flat panel detector 3 can judge a spot size, the left and right hands or different people hold laser pens with different emission diameters, and different operations of the left and right hands and operations of different people can be judged through the spot image obtained by the flat panel detector 3, which can be used for a single-person or multi-person interactive games.

Illustratively in the present embodiment, the flat panel detector 3 further includes the quantum dot thin film arranged between the optical structure and the photosensitive sensor, which is configured to convert the near-infrared light 201 emitted from the optical structure into visible light and the photosensitive sensor is configured to convert the visible light into the electrical signal and outputting the electrical signal.

The detection effect of the amorphous silicon photodiode 302 on the visible light is higher than that on the near-infrared light 201, and by using the arrangement of the quantum dot thin film, the near-infrared light 201 is converted into visible light and the detection effect of the flat panel detector 3 is improved.

The embodiment of the present disclosure also provides the display device which includes a display panel 4, a backlight module 5, and the above-mentioned flat panel detector 3, wherein the flat panel detector 3 is located between the display panel 4 and the backlight module 5;

the display device further includes a signal processing structure which is configured to connect to the photosensitive sensor through a read signal line to obtain a laser spot grayscale image.

It should be noted that the arrangement position of the signal processing structure can be set according to actual needs, and the signal processing structure can be integrated on the flat panel detector 3 or arranged on the display device.

Figure 4:
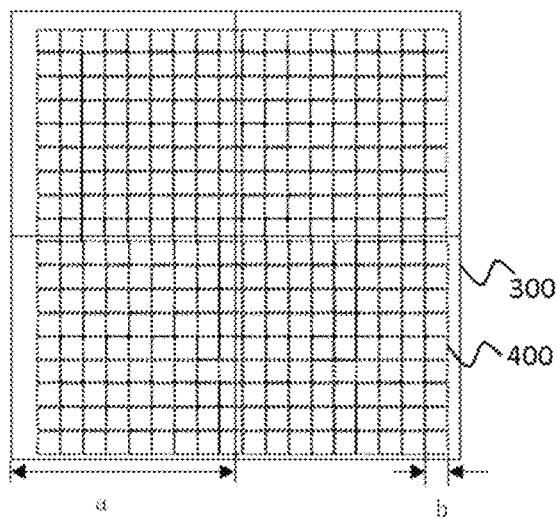
FIG. 4 is a schematic diagram of an overlap of pixels of a detection region and a display panel according to an embodiment of the present disclosure.

Illustratively in the present embodiment, with reference to FIG. 4, the display panel 4 includes a plurality of pixels 400 thereon, the orthographic projection of the detection region 300 on the display panel 4 covers the plurality of pixels 400, and the size of the detection region 300 is 5-20 times the size of one of the plurality of pixels 400. For example, the size b of the pixels 400 on the display module is 0.315 mm, and the size a of each of the detection regions 300 on the flat panel detector 3 is 3.15 mm (i. e. the size of each detection region is 3.15 mm).

In some implementation modes of the present embodiment, the size of each of the detection regions may be 1-5 mm, but is not limited thereto.

Illustratively in the present embodiment, the thickness of the black light shielding film layer in the direction perpendicular to the base substrate is 2-8 μm, and the size of the black light shielding film layer in the direction parallel to the base substrate is 3-50 μm larger than that of the amorphous silicon photodiode 302, so as to minimize the influence on the transmittance of the backlight 6 while ensuring the filtering effect.

Illustratively in the present embodiment, the photosensitive sensor includes the amorphous silicon photodiode 302 and the thin film transistor 301, wherein the size of the amorphous silicon photodiode 302 is smaller than or equal to the size of the pixel of the display panel 4.

Illustratively in the present embodiment, the size of the pixel of the display panel is 1-10 times the size of the amorphous silicon photodiode, and the pitch between two adjacent amorphous silicon photodiodes is 5-20 times the pitch between two adjacent pixels on the display panel.

In the embodiment of the present disclosure, each of the detection regions in the flat panel detector includes the photosensitive sensor and the optical structure, the optical structure includes the light condensing unit and the light filtering unit, wherein the photosensitive sensor includes the amorphous silicon photodiode and the thin film transistor, and the optical structure and the photosensitive sensor in the detection region cooperate to concentrate the infrared light of the larger region onto the amorphous silicon photodiode of the larger and smaller size (the size of the thin film transistor is generally smaller, a few microns, which can be ignored); and the size of the amorphous silicon photodiode is less than or equal to the size of one pixel on the display panel, and in some embodiments of the present embodiment, the size of the amorphous silicon photodiode is less than the size of one pixel on the display panel, for example, in a particular embodiment of the present embodiment, the size of the photosensitive sensor is 400 μm$^2$-40000 μm$^2$, increasing the transmittance of the backlight 6 and reducing the influence on the display effect of the display panel. In addition, with respect to the technical solution that the near-infrared light 201 is directly transmitted to the photosensitive sensor, the light condensing function of the light condensing unit and the light filtering function of the light filtering unit in the optical structure can reduce the power of the laser light source on the basis of not reducing the detection effect, so as to reduce the safety concerns when detecting the near-infrared light 201.

Illustratively in the present embodiment, the optical structure is the black light shielding lens, or the light condensing unit 304 is the transparent lens, the light filtering unit 303 includes the black light shielding lens, and the photosensitive sensor includes the amorphous silicon photodiode 302 and the thin film transistor 301;

the cross-sectional area of the black light shielding lens in the direction parallel to the base substrate is 4-10 times the area of the amorphous silicon photodiode 302 in the direction parallel to the base substrate.

With the above-described scheme, the filtering effect of the black light shielding lens can be ensured and the influence on the transmittance of the backlight 6 can be reduced.

The display device may be: any product or component having a display function, such as a liquid crystal television, a liquid crystal display, a digital photo frame, a mobile phone, a tablet computer, etc., wherein the display device further includes a flexible circuit board, a printed circuit board and a backboard.

The foregoing is only part of optimal embodiments of the present disclosure, it should be noted that, by those skilled in the art that various improvements and modifications may be made without departing from the principle of the present disclosure, and theses improvement and modifications shall fall within the scope of protection of the present disclosure.

What is claimed is:

1. A flat panel detector, comprising a base substrate and a plurality of detection regions arranged in an array on the base substrate, wherein each of the detection regions is successively provided with a photosensitive sensor and an optical structure along a direction away from the base substrate;

the optical structure comprises a condensing unit and a light filtering unit, wherein the condensing unit is used for receiving near-infrared light emitted by a laser light source and ambient light and performing light condensing and the light filtering unit is configured to shield the ambient light and transmit the near-infrared light;

the photosensitive sensor comprises an amorphous silicon photodiode and a thin film transistor, wherein the amorphous silicon photodiode is configured to convert the near-infrared light transmitted by the light filtering unit into an electrical signal, and the thin film transistor is configured to output the electrical signal to a reading signal line; and an orthographic projection of the optical structure on the base substrate completely covers the orthographic projection of the photosensitive sensor on the base substrate;

an area of an orthographic projection of the light filtering unit onto the base substrate is smaller than an area of an orthographic projection of condensing unit onto the base substrate, and an area of an orthographic projection of the photosensitive sensor onto the base substrate is smaller than the area of the orthographic projection of the light filtering unit onto the base substrate.

2. The flat panel detector according to claim 1, wherein the light condensing unit and the light filtering unit are provided independently, the light condensing unit is located on a side of the light filtering unit away from the base substrate and the orthographic projection of the light condensing unit on the base substrate completely covers the orthographic projection of the light filtering unit on the base substrate.

3. The flat panel detector according to claim 2, wherein the condensing unit is a transparent lens and the light filtering unit comprises a black light shielding film layer.

4. The flat panel detector according to claim 2, wherein the condensing unit is a transparent lens and the light filtering unit comprises a black light shielding lens.

5. The flat panel detector according to claim 1, wherein the condensing unit and the light filtering unit are integrally provided as an integral structure.

6. The flat panel detector according to claim 5, wherein the optical structure is a black light shielding lens.

7. The flat panel detector according to claim 1, wherein the amorphous silicon photodiode comprises a first electrode, a second electrode, and a photosensitive layer located between the first electrode and the second electrode arranged in sequence along a direction away from the base substrate, and the first electrode is connected to a drain electrode or a source electrode of the thin film transistor.

8. The flat panel detector according to claim 7, wherein the orthographic projection of a center of the amorphous silicon photodiode on the base substrate coincides with the orthographic projection of a center of the optical structure on the base substrate.

9. The flat panel detector according to claim 1, further comprising a quantum dot thin film located between the optical structure and the photosensitive sensor, which is configured to convert the near-infrared light emitted from the optical structure into the visible light, and the photosensitive sensor is configured to convert the visible light into the electrical signal and output the electrical signal.

10. A display device, comprising a display panel and a backlight module, and the flat panel detector according to claim 1, wherein the flat panel detector is located between the display panel and the backlight module;
the display device further comprises a signal processing structure which is configured to connect to the photosensitive sensor through a read signal line to obtain a laser spot grayscale image.

11. The display device according to claim 10, wherein the display panel comprises a plurality of pixels, an orthographic projection of the detection region on the display panel covers the plurality of pixels, and a size of the detection region is 5-20 times a size of one pixel of the plurality of pixels.

12. The display device according to claim 11, wherein the condensing unit is a transparent lens, the light filtering unit comprises the black light shielding film layer having a thickness of 2 to 8 μm in a direction perpendicular to the base substrate, and a size of the black light shielding film layer in the direction parallel to the base substrate is 3-50 μm larger than that of the amorphous silicon photodiode.

13. The display device according to claim 11, wherein the photosensitive sensor comprises the amorphous silicon photodiode and the thin film transistor, and the amorphous silicon photodiode has a size smaller than or equal to a size of a pixel of the display panel and the thin film transistor.

14. The display device according to claim 13, wherein the size of the pixel of the display panel is 1-10 times the size of the amorphous silicon photodiode, and the pitch between two adjacent amorphous silicon photodiodes is 5-20 times the pitch between two adjacent pixels on the display panel.

15. The display device according to claim 10, wherein the optical structure is a black light shielding lens, or the condensing unit is the transparent lens, the light filtering unit comprises the black light shielding lens, and the photosensitive sensor comprises the amorphous silicon photodiode and the thin film transistor;
the cross-sectional area of the black light shielding lens in the direction parallel to the base substrate is 4-10 times the area of the amorphous silicon photodiode in the direction parallel to the base substrate.

\* \* \* \* \*

UNITED STATES PATENT AND TRADEMARK OFFICE
CERTIFICATE OF CORRECTION

| | | |
|---|---|---|
| PATENT NO. | : 12,298,187 B2 | Page 1 of 1 |
| APPLICATION NO. | : 17/639257 | |
| DATED | : May 13, 2025 | |
| INVENTOR(S) | : Lin Zhou et al. | |

It is certified that error appears in the above-identified patent and that said Letters Patent is hereby corrected as shown below:

On the Title Page

Item (86) should read:
PCT No.: PCT/CN2021/090478
§ 371(c)(1), (2) Date: Feb. 28, 2022

Signed and Sealed this
First Day of July, 2025

Coke Morgan Stewart
*Acting Director of the United States Patent and Trademark Office*